Jan. 19, 1954     I. H. McLAREN ET AL     2,666,857
RADIOACTIVE TEST CIRCUIT
Filed Dec. 29, 1949     2 Sheets-Sheet 1
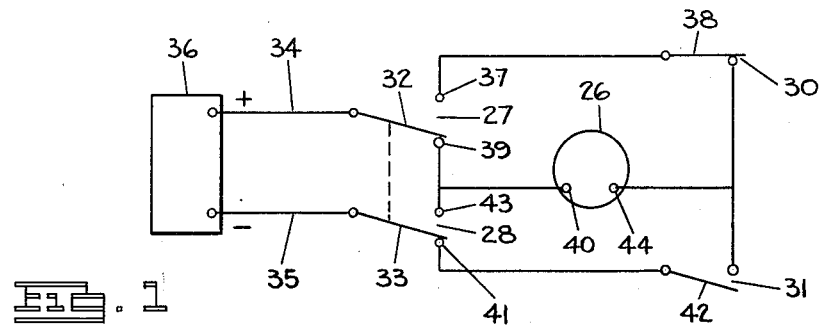
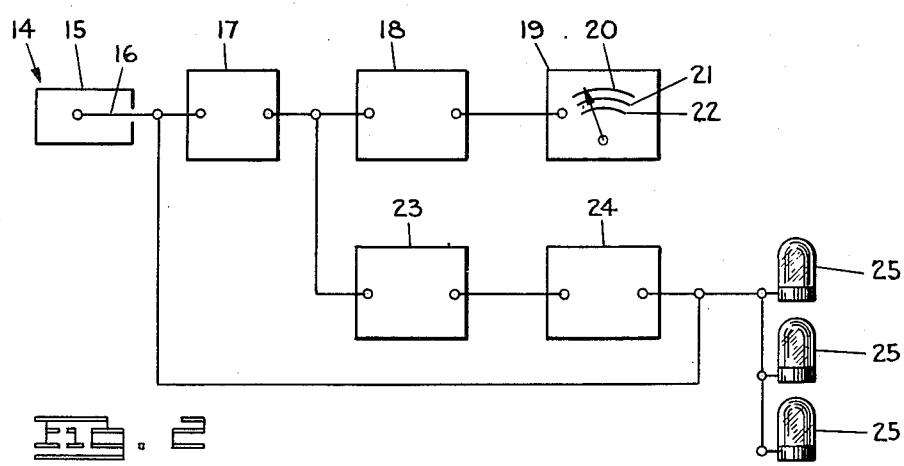
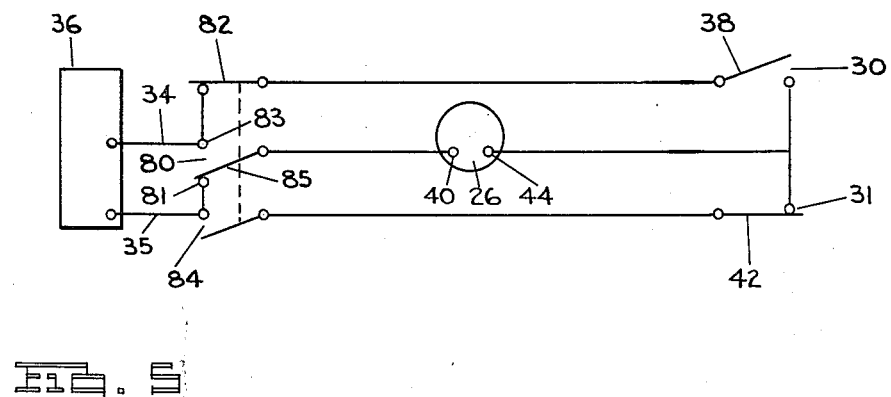
*INVENTOR.*
*IAN H. McLAREN &*
BY *CARL E. ALSTERBERG*
Ellsworth R. Roston
*ATTORNEY*

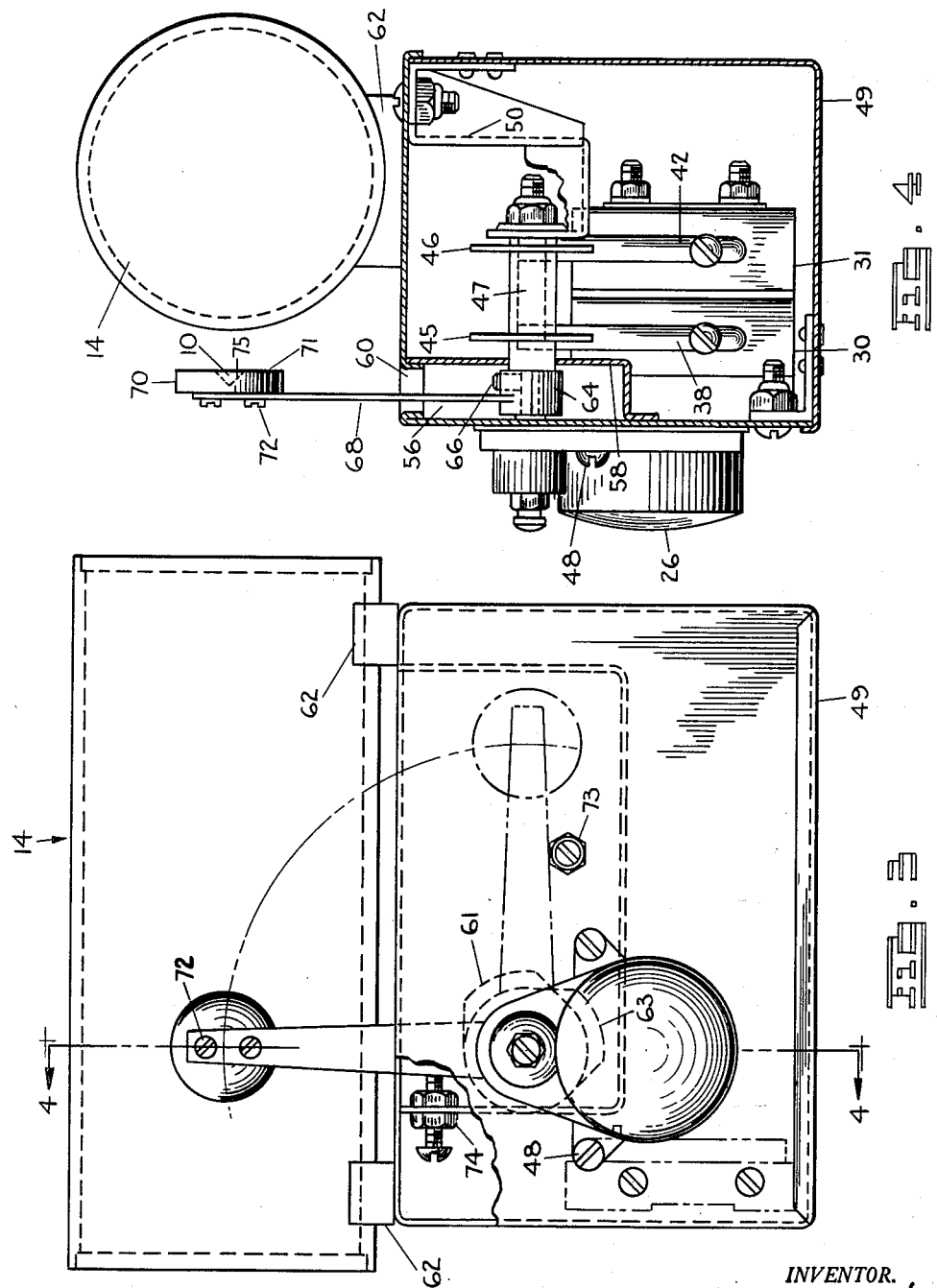

Patented Jan. 19, 1954

2,666,857

UNITED STATES PATENT OFFICE 2,666,857

RADIOACTIVE TEST CIRCUIT

Ian H. McLaren, Dearborn, and Carl E. Alsterberg, Detroit, Mich., assignors to Bendix Aviation Corporation, Detroit, Mich., a corporation of Delaware Application December 29, 1949, Serial No. 138,062

8 Claims. (Cl. 250—83.6)

This invention relates to electrical circuits and more particularly to circuits for testing the operation of a system for measuring the amount of radioactivity in a particular locality.

In our co-pending application Serial No. 138,769 filed January 10, 1950, we have disclosed an electrical system for measuring radioactivity. This particular system is adapted to measure a wide range of radioactivity and to provide a visual aid for instantaneously indicating the general level of radioactivity present. The system operates upon the principle of employing an ionization chamber to convert the radiations into a measurable electric current, then amplifying the current and passing it through a calibrated indicator.

In order to be assured that the above system is operating properly and that the meter is correctly calibrated, a test specimen having a known amount of radioactivity is provided in a test circuit. The circuit maintains the radioactive specimen out of the field of the ionization chamber until a calibration measurement is desired. Then the circuit operates to rotate the specimen through a predetermined arc into the field of the ionization chamber.

An object of this invention is to provide an electrical circuit for checking the operation of a system for measuring the amount of radioactivity in a particular locality.

Another object of this invention is to provide an electrical circuit of the above character which is simple in construction, efficient and reliable in operation.

Still another object is to provide an electrical circuit of the above indicated character adapted to rotate a specimen having a known radioactivity through a predetermined arc into the field of an ionization chamber so that a calibrating measurement may be obtained.

Other objects and advantages of the invention will be apparent from a more detailed description of the invention and from the appended drawings and claims.

In the drawings:

Figure 1 is a diagram of an electrical test circuit for calibrating the measurements of an electrical system for measuring the amount of radioactivity in a particular locality;

Figure 2 is a block diagram of an electrical system which measures radioactivity;

Figure 3 is a front elevational view of the testing apparatus with some of the parts broken away to show other parts in detail;

Figure 4 is a sectional view taken substantially along the line 4—4 of Figure 3; and Figure 5 is a schematic diagram illustrating another electrical test circuit for calibrating the measurements of the system shown in Figure 2.

In one of the embodiments of the invention, a test specimen 10 (Figure 4) having a known amount of radioactivity is provided to check the operation of a system for measuring the amount of radioactivity penetrating an ionization chamber, generally indicated at 14. (Figure 2.) The ionization chamber preferably has cylindrical metallic walls serving as a positive terminal 15 and an axially disposed metallic rod serving as a negative terminal 16, the rod being suitably insulated from the cylinder itself. Gamma rays penetrate the walls of the ionization chamber and produce electrons and positive ions in a suitable gas, such as argon, sealed within the chamber. The electrons flow to terminal 15 and the ions to terminal 16 and produce a current through a detector 17. The current is amplified by an amplifier 18 before it is introduced to an indicator 19.

The indicator 19 has a plurality of scales each of which measures a different range of radioactivity. Thus, one scale 20 may measure 0–0.1 roentgens per 24-hour day, another scale 21, 0–0.5 roentgens per 24-hour day and a third scale 22 0–50 roentgens per 24-hour day. Each scale has a different color and is associated with a bulb 25 which has the same color. When illuminated, each bulb provides a visual aid for instantaneously indicating the particular scale which should be read, as disclosed in co-pending application Serial No. 138,061, filed December 29, 1949, by Fred N. Blackmore and Donald F. Clinton and co-pending application Serial No. 138,769, filed January 10, 1950, by us. In order for the indicator to measure the radioactivity over the ranges represented by the various scales and for that bulb to be illuminated which has the same color as the scale to be read, an automatic range-changing circuit 23 and a switching system 24 are provided.

The range-changing circuit 23 includes relays which actuate switches in the switching circuit 24 to illuminate the proper bulb 25. At the same time, the sensitivity of the detector 17 is adjusted by the switching circuit 24 so that the proper indicator scale may be used.

The test circuit shown in Figure 1 is provided for assurance that the above system is functioning properly and that the indicator 19 is correctly reading the amount of radioactivity present. The circuit includes a motor 26, a pair of ganged, manually operated, double-throw switches 27 and 28 and a pair of motor-driven switches 30 and 31.

A double pole, double-throw switch may be used instead of the single pole, double-throw switches 27 and 28.

Movable contacts 32 and 33 of switches 27 and 28 are respectively connected to positive and negative lines 34 and 35 of a direct current power supply 36. One stationary contact 37 of switch 27 is connected to the movable contact 38 of switch 30 and the other contact 39 is connected to a terminal 40 of the motor 26. Likewise, one stationary contact 41 of switch 28 is connected to the movable contact 42 of switch 31 and the other contact 43 is connected to motor terminal 40. The stationary contacts of switches 30 and 31 are connected to terminal 44 of motor 26.

The switches 30 and 31 are operated by cams 45 and 46 (Figure 4) mounted on a shaft 47 driven by the motor 26. The motor is attached as by screws 48 (Figure 3) to a housing 49, and the shaft 47 extends through the housing and is supported at its inner end as by a bracket 50 (Figure 4) suitably attached to the housing. A compartment 56 in the housing is provided as by a partition 58, and an opening 60 in the top of the housing communicates with the compartment. The compartment 56 houses the radioactive specimen 10 when a calibration measurement is not being made, and when so enclosed the specimen 10 offers a minimum amount of interference to the action of the system shown in Figure 2. The ionization chamber is positioned above and to one side of compartment 56 and is fastened to the housing as by brackets 62.

The cams 45 and 46 have lobes 61 and 63, respectively, (Figure 3). The lobes lie above the movable contacts 38 and 42 (Figure 4) of the micro switches 30 and 31 to press against the contacts and open the switches. The lobes are spaced from each other for a reason which will be explained hereinafter. A collar 64 is sleeved on shaft 47 within compartment 56 and is fixed to the shaft as by a screw 66. The collar has thereon an arm 68 supporting a disc 70 attached as by screws 72 to the outer end of the arm.

The disc 70 is so positioned with respect to the ionization chamber 14 that the face 71 thereof directly faces the chamber, and the axis of the disc lies on the same horizontal plane as the axis of the chamber when arm 68 is in vertical position. In case the timing sequence of the circuit shown in Figure 2 fails to function properly, the rotation of the disc is limited in one direction by a stop 74 (Figure 3) attached to partition 58 and in the other direction by a stop 73 on the housing. A radioactive specimen such as radioactive cobalt is applied as by evaporation to a central pocket 75 in disc face 71 to form the test specimen 10. The specimen has a long half-life, thereby providing a substantially constant effect on the ionization chamber in its calibrating position.

As previously stated, disc 70 normally rests in compartment 56 so that it offers a minimum amount of interference to the operation of the system shown in Figure 1. Any interference that does take place is constant and therefore can be corrected on the readings of indicator 19 by properly calibrating the indicator.

With disc 70 in its normal position, ganged switches 27 and 28 are in the down or "Operate" position whereby contacts 32 and 33 touch contacts 39 and 41, respectively; switch 30 is closed and switch 31 open. As a result, no current flows through motor 26. When it is desired to make a test measurement, switches 27 and 28 are manually rotated upwards to the "Calibrate" position. This causes a continuous circuit to be established from power supply 36 through lead 34, contacts 32 and 37, switch 30, terminal 44, motor 26, terminal 40, contacts 43 and 33 and lead 35 back to the power supply.

The motor therefore operates to rotate disc 70 upwardly into the field of the ionization chamber. As the motor starts to rotate, cam 46 leaves contact 42 and permits switch 31 to close. After rotating through a predetermined arc, cam lobe 61 moves into position to press contact 38 and open switch 30. This opens the continuous circuit through motor 26 and the motor stops rotating with the disc 70 directly facing the ionization chamber.

Since the radioactivity of disc 70 is a known constant, meter 19 should give a constant reading when the disc is in the "Calibrate" position. Although the "Calibrate" position of the disc has been described as being on a horizontal line with the axis of the ionization chamber 14, it may actually be above or below the axis of the chamber without appreciably affecting the accuracy of the calibration measurements, provided that proper allowance is made for the change in position.

Preferably the radioactivity of the disc is maintained at a low value for safety reasons, permitting a check measurement to be made only for the low indicator scales, such as scales 20 and 21. If considered desirable, however, the disc can have a greater radioactivity so that a check measurement may be made for all indicator scales. In such a case, lead plates of varying thicknesses can be placed between the disc and the ionization chamber to diminish the radioactive effect for the calibration measurements on the low scales.

After calibration readings have been taken, the disc 70 may be returned to its position in compartment 56 by rotating switches 27 and 28 downwards to the "Operate" position. Since switch 31 is closed, a continuous circuit is established which includes the power supply 36, lead 34, contacts 32 and 39, terminal 40, motor 26, terminal 44, switch 31, contacts 41 and 33 and lead 35. The motor starts to rotate in a direction opposite to that discussed above and, as it does so, cam 45 releases contact 38 and switch 30 closes. As disc 70 is returning to its resting position in compartment 56, cam 46 opens switch 31 and the motor stops rotating.

Figure 5 illustrates a modification of the test circuit shown in Figure 1. The circuit includes the motor 26, the switches 30 and 31 and a manually operated double-throw switch 80 to which a pair of single-throw switches 82 and 84 are ganged. The stationary contacts 81 and 83 of switch 80 are connected by leads 34 and 35 to the power supply 36 and to the stationary contacts of switches 82 and 84, respectively, and movable contact 85 is connected to motor terminal 40. The movable contacts of switches 82 and 84 are connected to movable contacts 38 and 42 of the motor-driven switches 30 and 31, respectively. The stationary contacts of the motor-driven switches are connected to motor terminal 44.

When the test circuit is not being operated, switch 80 has its movable contact 85 in engagement with contact 81, switches 82 and 31 are closed and switches 84 and 30 are open. As a result, no current flows through the motor. To obtain a calibrating measurement, switch 80 is rotated upwardly, causing switch 84 to close and switch 82 to open. A continuous circuit is provided from power supply 36 through lead 34, contacts 83 and 85, terminal 40, motor 26, terminal 44, switch 31, switch 34 and lead 35 back to the power supply. As the motor starts to rotate, switch 30 closes. After the motor has rotated through a predetermined arc, switch 31 opens and the motor stops.

To return the motor to its original position, switch 80 is rotated so that contact 85 touches contact 81. This causes switch 82 to close and switch 84 to open, whereby a continuous circuit is established which includes power supply 36, lead 34, switch 82, switch 30, terminal 44, motor 26, terminal 40, contacts 85 and 81 of switch 80 and lead 35. Since the current through the motor is reversed, the motor returns to its original position, with switch 31 closing at the beginning of the rotation and switch 30 opening at the end of the rotation.

Although this invention has been disclosed and illustrated with reference to particular applications, it must be appreciated that the principles involved are susceptible of numerous other applications which will be apparent to persons skilled in the art.

Having thus described the various features of the invention, what we claim as new and desire to secure by Letters Patent is:

1. In an apparatus for testing the operation of a system for measuring the amount of radioactivity in a particular locality, an ionization chamber, a radioactive specimen, a motor for driving the radioactive specimen, the motor normally positioning the radioactive specimen out of the field of the ionization chamber, manually operated switching means connected to the motor, and a pair of motor-driven switches operative to stop the motor after a predetermined amount of rotation and prepare the motor for rotation in a reverse direction.

2. In an apparatus for testing the operation of a system for measuring the amount of radioactivity in a particular locality, an ionization chamber, a radioactive specimen, a motor for positioning the radioactive specimen in the field of the ionization chamber, manually operative double-throw switching means connected to the motor, the switching means being adapted in one position to effectuate a rotation of the motor in one direction and in the other position to reverse the direction of rotation of the motor, and a pair of motor-driven switches operative after a predetermined amount of rotation to stop the motor and prepare the motor for rotation in a reverse direction upon the operation of the manual switching means.

3. In an apparatus for testing the operation of a system for measuring the amount of radioactivity in a particular locality, a specimen having a known amount of radioactivity, an ionization chamber adapted to convert radioactive emanations into a measurable electric current, a motor for driving the radioactive specimen, the motor normally positioning the specimen out of the field of the ionization chamber, a power source, at least one manually operated switch between the motor and the power source, and a pair of motor-driven switches connected to the power source and so arranged relative to each other that a different switch is closed to stop the motor after a predetermined amount of rotation and to prepare the motor for rotation in an opposite direction.

4. In an apparatus for testing the operation of a system for measuring the amount of radioactivity in a particular locality, a test specimen having a known amount of radioactivity, an ionization chamber, means associated with the chamber for measuring the radioactivity therein, the test specimen being normally positioned out of the field of the ionization chamber, a motor for moving the specimen into the field of the ionization chamber, a power source, a manually operated switch having a movable contact and a pair of stationary contacts, the stationary contacts being connected to the power source and the movable contact being connected to the motor, a pair of motor-driven switches connected to the power source, both switches being closed during the operation of the motor and a different one of the switches being opened at the end of each motor rotation, and a pair of switches connected between the power source and the motor-driven switches and being adapted to reverse the current through the motor upon the operation of the manual switch.

5. In an apparatus for testing the operation of a system for measuring the amount of radioactivity in a particular locality, a test specimen having a known amount of radioactivity, an ionization chamber, means for measuring the amount of radioactivity within the chamber, a motor for moving the test specimen into the field of the ionization chamber so that a calibrating measurement may be made, a power source, a pair of manually operated switches each having a movable contact connected to the power source and a stationary contact connected to the motor, and a pair of motor-driven switches connected to the motor, the motor-driven switches being closed during the rotation of the motor and a different one of the switches being opened after a predetermined time to stop the motor.

6. In apparatus for testing the operation of a system which measures the amount of radioactivity in a particular locality, a test specimen having a known amount of radioactivity, an ionization chamber, means associated with the chamber for measuring the radioactivity therein, the test specimen being normally positioned out of the field of the ionization chamber, a motor for moving the specimen into the field of the ionization chamber, a power source, a pair of ganged, manually operated switches each having a movable contact and a pair of stationary contacts, the movable contacts being connected to the power source, a pair of motor-driven switches, the switches being closed during the operation of the motor and one of the switches being opened after a predetermined movement of the motor to stop its rotation and prepare it for rotation in an opposite direction, and the stationary contacts of the manual switches being connected to the motor and the motor-driven switches to provide for a continuous circuit through the motor in the calibrating position of the manual switches and a reverse current through the motor upon the subsequent operation of the manual switches.

7. In apparatus for testing the operation of a system for measuring the amount of radioactivity in a particular locality, an ionization chamber, means for measuring the amount of radioactivity penetrating the chamber, a motor, an arm adapted to be driven by the motor, a radioactive specimen of known potency carried on the arm and adapted to be driven by the motor to a predetermined position relative to the ionization chamber, a shielded compartment for housing the radioactive specimen in one position of the arm, a pair of motor-actuated switches connected to the motor, each switch being closed during the movement of the radioactive specimen, one of the switches being opened upon the movement of the radioactive specimen into the shielded compartment so as to discontinue the operation of the motor and the other switch being opened upon the movement of the radioactive specimen to the predetermined position relative to the ionization chamber so as to discontinue the operation of the motor, and means operative in conjunction with each of the switches to establish a continuous circuit for driving the radioactive specimen towards the ionization chamber or shielded compartment.

8. In apparatus for testing the operation of a system for measuring the amount of radioactivity in a particular locality, an ionization chamber, means for measuring the amount of radioactivity penetrating the chamber, a rotatable arm, a radioactive specimen of known potency carried by the arm, a motor for driving the arm to bring the radioactive specimen to a predetermined position relative to the ionization chamber to obtain a calibration of the operation of the ionization chamber, a shielded compartment for housing the arm and the radioactive specimen during the times that calibration tests of radioactivity are not being made, a pair of cams adapted to be driven by the motor, a pair of switches controlled by the cams, each cam being positioned to maintain the switches closed during the rotation of the arm, one of the cams being operative upon the movement of the radioactive specimen into the shielded compartment to open its associated switch and the other cam being operative upon the movement of the specimen to its predetermined position relative to the ionization chamber to open its associated switch, and switching means associated with the motor and the cam-operated switches to establish a continuous circuit in one direction through the motor for rotating the arm towards the ionization chamber and in another direction for rotating the arm towards the shield compartment.

IAN H. McLAREN.
CARL E. ALSTERBERG.

References Cited in the file of this patent

UNITED STATES PATENTS

| Number | Name | Date |
|---|---|---|
| 2,329,280 | Lunken et al. | Sept. 14, 1943 |
| 2,340,174 | Chance | Jan. 25, 1944 |
| 2,405,174 | Friedman | Aug. 13, 1946 |

OTHER REFERENCES

Proceedings of the I. R. E., volume 37, No. 8, August 1949, pages 913-922.